United States Patent

Eyler

[11] Patent Number: 5,832,556
[45] Date of Patent: Nov. 10, 1998

[54] ENCODED CARD FOR CLEANING CURRENCY READERS

[75] Inventor: Stanley H. Eyler, San Diego, Calif.

[73] Assignee: Clean Team Company, San Diego, Calif.

[21] Appl. No.: 733,440

[22] Filed: Oct. 18, 1996

Related U.S. Application Data

[60] Provisional application No. 60/005,631, Oct. 19, 1995.

Related U.S. Application Data

[63] Continuation-in-part of Ser. No. 613,293, Mar. 11, 1996, which is a continuation of Ser. No. 323,151, Oct. 14, 1994, Pat. No. 5,525,417.

[51] Int. Cl.[6] ........................................ A47L 13/12
[52] U.S. Cl. .................. 15/104.93; 15/118; 15/210.1
[58] Field of Search ................. 15/105, 104.93, 15/118, 210.1; 235/493

[56] References Cited

U.S. PATENT DOCUMENTS

| | | | |
|---|---|---|---|
| 3,069,815 | 12/1962 | Valentine | 15/210.1 |
| 3,457,391 | 7/1969 | Yammoto | 235/493 |
| 3,676,644 | 7/1972 | Vaccaro | 235/493 |
| 4,114,032 | 9/1978 | Broson | 235/493 |
| 4,933,015 | 6/1990 | White | 15/210.1 |
| 4,951,425 | 8/1990 | Naghi | 15/210.1 |
| 5,148,572 | 9/1992 | Wells | 15/118 |
| 5,359,183 | 10/1994 | Skodlar | 235/493 |
| 5,412,199 | 5/1995 | Finkelstein | 235/493 |

FOREIGN PATENT DOCUMENTS 1961899  8/1971  Germany .............................. 15/210.1

*Primary Examiner*—Randall E. Chin
*Attorney, Agent, or Firm*—Lewis Anten, Esq.; Amedeo Ferraro, Esq.

[57] ABSTRACT

A cleaning card for cleaning the sensors and rollers and other parts of currency readers is disclosed. The cleaning card of the present invention comprises a single layer, non-laminated or a multi-layer, laminated cleaning material having the same or similar characteristics of the currency that is normally read by the currency reader and may comprise an encoded portion capable of activating a currency reader to accept the cleaning card into the currency reader. The cleaning card of the present invention goes into the currency reader, and cleans the reader heads, feed path, rollers and guides without being validated by the currency reader as actual currency.

15 Claims, 4 Drawing Sheets

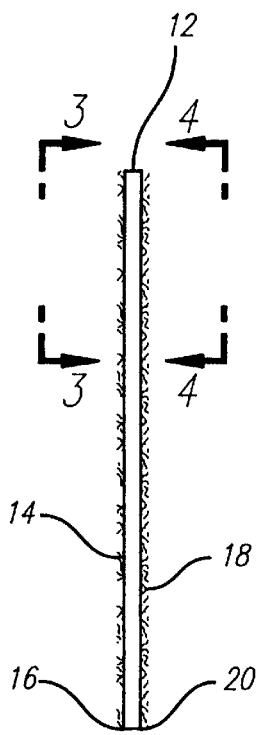
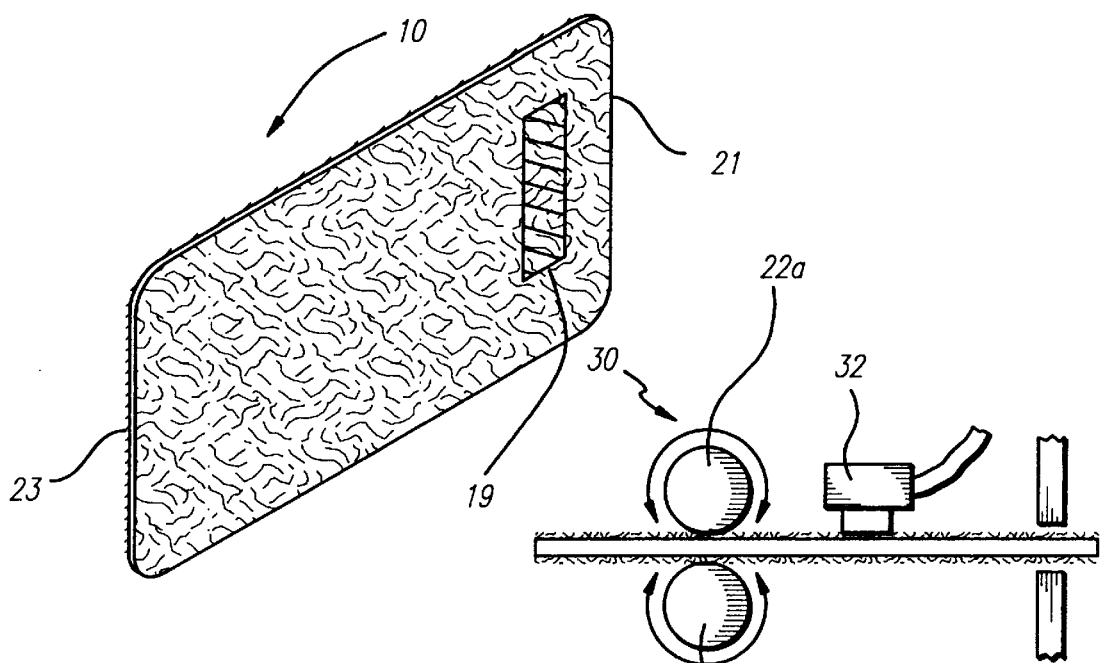
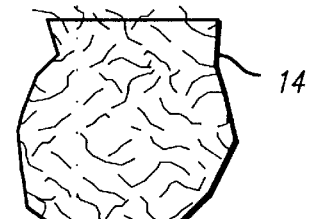
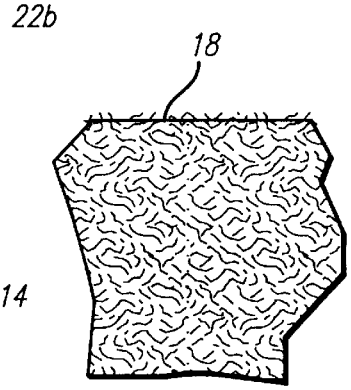
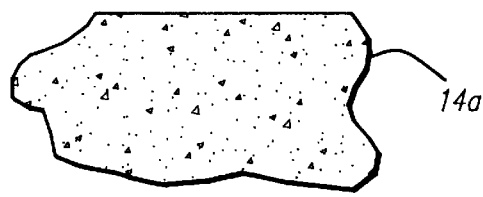

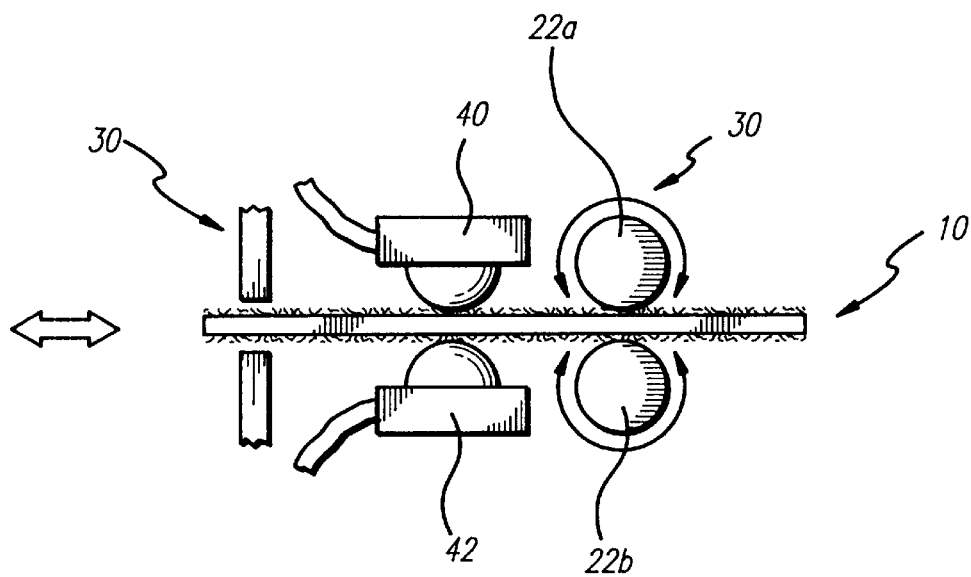
FIG. 5A
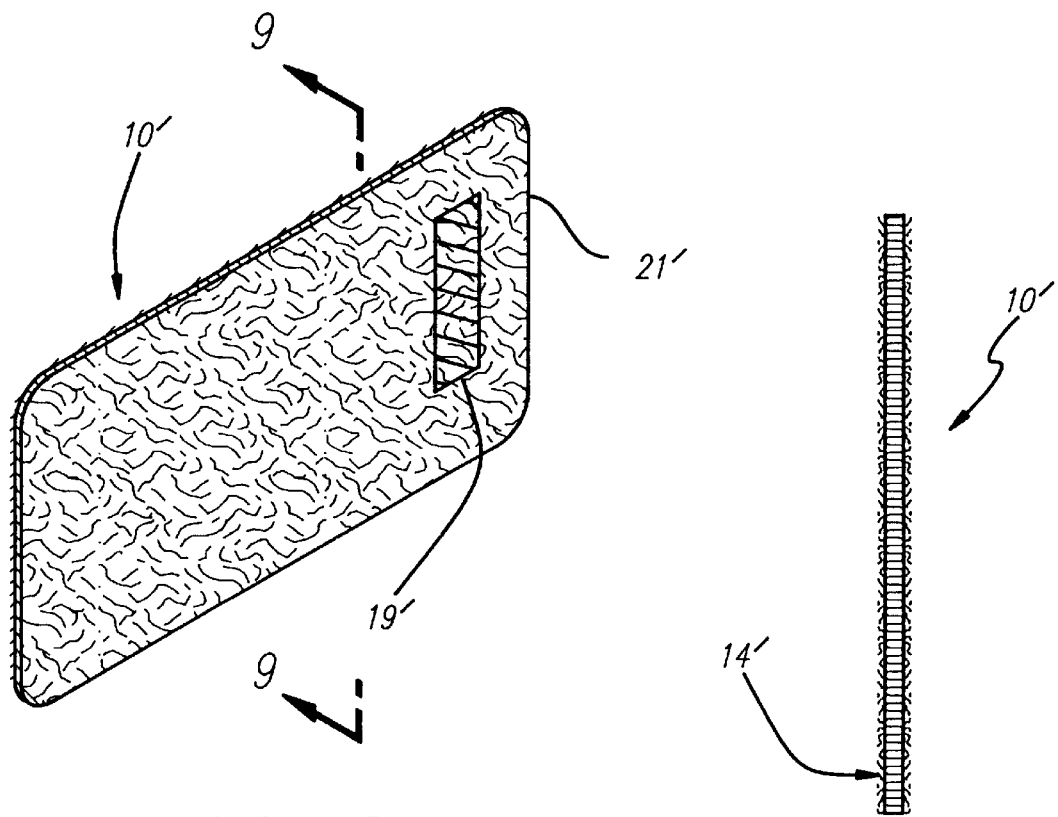
FIG. 8
FIG. 9

ENCODED CARD FOR CLEANING CURRENCY READERS

RELATED APPLICATIONS

This application claims priority of co-pending U.S. provisional application Ser. No. 60/005,631 filed on Oct. 19, 1995. This application is also a continuation in part of patent application Ser. No. 08/613,293 filed on Mar. 11, 1996, now pending, which is a continuation of application Ser. No. 08/323,151 filed on Oct. 14, 1994, U.S. Pat. No. 5,525,417 incorporated herein by reference.

BACKGROUND OF THE INVENTION

1. Field of the Invention

The present invention relates generally to cleaning cards for cleaning optical, magnetic, chip, and thermal reading heads, photo and optic sensors, feed path rollers associated therewith in currency reading devices.

2. Description of the Related Art

Currency identification devices are used in many industries such as gaming, wagering, lottery, vending (food, music, dry goods), telephone, photo, lodging, kiosk and many other industries where self-service items and/or services may be rendered with or without the presence of an attendant. Currency devices for identifying paper currency, typically include a currency reader, such as a dollar bill reader, which employ various reading means for identifying and validating currency used with the currency reader. Such currency reading means may comprise magnetic heads and sensors, optical and photo scanners, various light sensors and the like.

Currency readers typically have a light emitter and a corresponding light receptor and may include photo and/or machine readable software for reading the currency. During the operation of the currency reader, a light beam from the light emitter in the currency reader is broken when an item, such as a dollar bill, is inserted between the light emitter and the light receptor. The breaking of the light beam causes a travel mechanism, such as the pinch rollers of the currency reader feed path, to engage the currency and thereby draw the currency into the currency reader. The light beam also functions to measure the length and/or other data of the currency being inserted into the currency reader in order to make sure that the currency is of the appropriate length, which for U.S. currency is approximately six inches long as an example.

Currency is typically also read by a magnetic head located inside the currency reader which functions to identify and validate the currency. The magnetic head of the currency reader searches for a magnetic signal located on currency in order to identify and validate the currency. If no magnetic signal is located by the magnetic head, the currency reader rejects the item that is being inserted before the item is drawn into the currency reader more than two inches. In some currency readers, an item which does not have the proper magnetic code is not allowed to be drawn into the currency reader more than one inch or may not be drawn into the currency reader at all.

In order to validate the currency being read, a currency reader employing a magnetic head searches one or more locations on the currency being inserted in the currency reader for the presence of magnetic ink. For example, the currency reader may search for the presence of magnetic ink on the leading edge of the currency, in the middle of the currency and then search the trailing edge of the currency. As each of the magnetic ink areas are detected by the currency reader, the currency travels further into the currency reader. The currency is ultimately validated and accepted by the currency reader when all of the magnetic ink areas are detected by the currency reader. In the event that all of the magnetic ink areas are not detected by the currency reader, the currency is not accepted and is ejected from the currency reader.

The ejection of an item purported to be currency may occur at different stages of the insertion of the item into the currency reader. For example, if only the magnetic ink area on the leading edge is present on the item being inserted into the currency reader, the item will travel into the currency reader until the next detection point, which may be the middle of the item, such that the item is inserted approximately fifty percent of its length prior to being ejected. Similarly, if the item has a magnetic ink area on the leading edge of the item, and in the middle of the item, but not on the trailing edge, the item will travel into the currency reader past the middle of the item to the trailing edge of the item before it is ejected from the currency reader.

Some currency readers can detect a combination of magnetic and optical codes in order to identify and validate currency. For example, the currency reader may require the presence of a magnetic code at the leading edge of the currency in order for the currency to be inserted into the currency reader and to activate the feed path mechanism to draw the currency into the currency reader. Such a currency reader may also have an optical sensor for detecting an optical pattern on the currency, such as the light and dark patterns formed by the presidential portraits in contrast with the lighter background surrounding the portraits of a dollar bill. If the specific light and dark pattern is not detected by the currency reader, the item inserted into the currency reader is rejected.

As a result of the high volume of currency typically processed by currency readers, the sensors of the currency readers become soiled from contaminants that may be present on the currency itself, from airborne contaminants, and from contamination occurring from the friction between feed path rollers used to transport the currency into the currency reader. The currency passing through the currency reader causes the transfer of contaminants from the currency to the rollers, sensors and magnetic heads of the currency reader. As the contaminants accumulate on the rollers, sensors and magnetic heads, the efficiency of such component is reduced or completely compromised. For example, the contaminants may change the friction of the roller surfaces causing the rollers to slip. Similarly, contaminants can cause the rollers to lose their elastomers over time. Elastomers make the rollers soft and pliable and give the "grip" often needed to accept, for example, dollar bills, and the like. Contaminants may reduce the gap through which the currency passes, therefore making passage of the currency into the currency reader difficult. The contaminants can also render the processing equipment inside the currency reader inoperable.

In order to operate currency readers efficiently, the rollers, sensors and/or guides of the currency readers must be cleaned to remove dirt, magnetic oxides, ink residue, paper dust (flash) and numerous other contaminants from all types of concealed heads, photo and optic sensors, and feed path and other rollers. As a result of cleaning, the currency readers operate more efficiently and equipment downtime and service calls are reduced. The rollers, sensors and/or guides of the currency readers are usually hard to reach and/or access from the exterior of the currency reader and require the opening and/or disassembly of the machine in which the currency reader is located and/or the opening and disassembly of the currency reader itself. The use of rags, towels and/or swabs to clean the currency readers is ineffective because it can result in uneven high and low spots on the feed path rollers, which should remain even and completely symmetrically opposed to each other in order to operate properly.

The cleaning of currency readers requires a cleaning system in which the currency reader is activated such that a cleaning material, like a cleaning card for example, may travel the same path as the currency being read in order to clean the rollers, and the sensors of the currency reader. The sensors of currency readers are highly specialized in detecting one or more specific characteristics of the currency being read in order to identify a particular type of currency and activate the currency reader to accept the currency being inserted in the currency reader. The sensors also function to identify and validate the currency being inserted into the currency reader. In order for currency to be accepted by the currency reader, the specific characteristics of the currency must be an identical match to the specific characteristics for which the sensors of the currency reader are set up to detect.

Therefore, a cleaning material must also have the same or similar characteristics of the currency being read in order to activate the currency reader accepted the cleaning material into the currency reader and clean the path and sensors of the currency reader. No such system is presently available to accomplish such a function.

SUMMARY OF THE PRESENT INVENTION

The present invention is directed to a cleaning card for cleaning the sensors and rollers and other parts of currency readers. The cleaning card of the present invention comprises a cleaning material having the same or similar characteristics of the currency that is read by the currency reader. The cleaning card of the present invention may be made of a single layer, non-laminated or a multi-layer, laminated cleaning material. The cleaning card may comprise an encoded portion capable of activating a currency reader to accept the cleaning card into the currency reader. The encoded portion may comprise magnetic properties, reflective properties, or any other property capable of activating a currency reader. For example, the encoded portion may include a pattern of "on and off" data, such as light reflecting and non-reflecting areas, or may be a pattern of light and dark areas similar to a bar code, or may correspond to a pattern of light and dark areas of a particular track of the currency being read.

In the preferred embodiment of the present invention, the cleaning card activates a currency reader in two ways, the first being with the use of light and the second being with the use of magnetics. In order to activate the optical sensors of a currency reader, the cleaning card of the present invention comprises at least a portion that is opaque such that a light beam is broken when the card is inserted between the light emitter and the light receptor of the currency reader. The breaking of the light beam causes the travel mechanism of the currency reader, such as the pinch rollers of the feed path, to engage the cleaning card, thereby drawing the cleaning card into the reader. If the light beam is not broken by the item being inserted into the currency reader, then the currency reader is not activated and the item is not accepted by the reader.

Since the magnetic heads of currency readers typically detect magnetic properties and/or magnetic encoding found in the currency that is being inserted into the currency reader, if no magnetic signal is detected by the magnetic heads, no entry of the currency into the currency reader is allowed. Therefore, if the cleaning card does not have the appropriate magnetic properties no cleaning of the currency reader is possible.

The cleaning card of the present invention may comprise a combination of magnetic encoding and optical patterns to simulate the magnetic encoding and optical patterns being sought by a currency reader. For example, the cleaning card may have a magnetic code on the leading edge of the card, in the middle of the card and at the trailing edge of the card. In addition to the areas between the magnetic codes, the card may have light and dark patterns which simulate the pattern on a dollar bill, such that the optical sensors of a currency reader detect the light and dark patterns to activate the currency reader. The cleaning card is then identified as currency and is drawn into the currency reader in its entirety, but is not validated because all of the magnetic and optical codes normally present on actual currency are not present on the cleaning card. The cleaning card of the present invention goes into the currency reader, and cleans the reader heads, path, rollers and guides. It is appreciated that less than the entire cleaning card may be drawn into the currency reader prior to rejection by varying the placement and number of the magnetic encoding and optical patterns.

It is preferred that the cleaning card is not validated by the currency reader, such that the cleaning card is rejected from the currency reader and returned to the operator. In this manner the cleaning card of the present invention achieves its purpose in cleaning the sensors and feed path of a currency reader without being validated by the currency reader as actual currency which would disrupt the actual count of currency received by the currency reader.

In the preferred embodiment, the cleaning card of the present invention includes at least one magnetic and/or optical code at its leading edge such that the card enters the currency reader at least fifty percent (50%) of its length. Once the cleaning card of the present invention goes into the currency reader approximately fifty percent of its length, it is enough to perform the cleaning procedure, and the cleaning card is then rejected by the currency reader. The currency reader rejects the cleaning card since no other magnetic or optical codes are present on the card of the present invention. It is appreciated that for optimum results, 80–95% of the cleaning card length may be accepted into the currency reader. The length of the cleaning card entering the currency reader is controlled by the number and placement of magnetic and or optical codes on the cleaning card to simulate the codes present on currency.

In one embodiment of the cleaning card of the present invention, magnetic ink is printed on both laminated and non-laminated cleaning cards to provide the magnetic properties necessary to activate the magnetic heads of the currency reader. On laminated cards, the magnetic ink may be printed on the card with the same material on both sides and or alternatively the material on each side of the card may be different from the other. The magnetic code may be printed with a magnetic ink that is impervious to alcohol. In this manner the cleaning card of the present invention may be saturated with 10% isopropyl alcohol (IPA) and 90% deionized water or other liquids since straight IPA fogs the sensitive lens of well-known, widely distributed currency readers and validators. In the laminated embodiment of the cleaning card of the present invention, the magnetic code may be printed on the exterior of the laminated layers or may be printed between the laminated layers in order to protect the magnetic encoding from wear. The magnetic ink may also be encoded to work in various magnetic readers capable of detecting magnetic codes.

In the preferred embodiment of the present invention, the cleaning card has a length of approximately six inches, a width of approximately 2.5 inches, and a thickness of approximately 0.007–0.018 inches to approximate the physical dimensions of U.S. currency. However, it is appreciated that the cleaning card of the present invention may have a size corresponding to the size of foreign currency or various coupons, chips, tickets etc for use with reading devices without departing from the scope of the present invention.

BRIEF DESCRIPTION OF THE DRAWINGS

FIG. 1 is a side perspective view of the encoded cleaning card of the present invention.

FIG. 2 is an end view of the card of FIG. 1, showing a first side surface with a first material bonded thereon, and a second side surface with a second material bonded thereon.

FIG. 3 is an enlarged fragmentary plan view of a first material taken generally along the line 3—3 of FIG. 2.

FIG. 4 is an enlarged fragmentary plan view of a second material taken generally along the line 4—4 of FIG. 2.

FIG. 5A is a side view of the cleaning card of FIG. 1, illustrating the manner in which the cleaning card passes by an exemplary optical sensor such as a light emitter and light receiver, and between a pair of rollers.

FIG. 5B is a side view of the cleaning card of FIG. 1, illustrating the manner in which the cleaning card passes by an exemplary magnetic head, and between a pair of rollers.

FIG. 6 is an enlarged fragmentary plan view of an alternative first material used in the cleaning card of the present invention.

FIG. 8 is a side perspective view of an alternative embodiment of the encoded cleaning card of the present invention made of a single layer of material that is non-laminated.

FIG. 9 is a cross sectional view along lines 9—9 of FIG. 8 illustrating the non-laminated encoded cleaning card of the present invention.

DETAILED DESCRIPTION OF THE DRAWINGS

Figure 7:
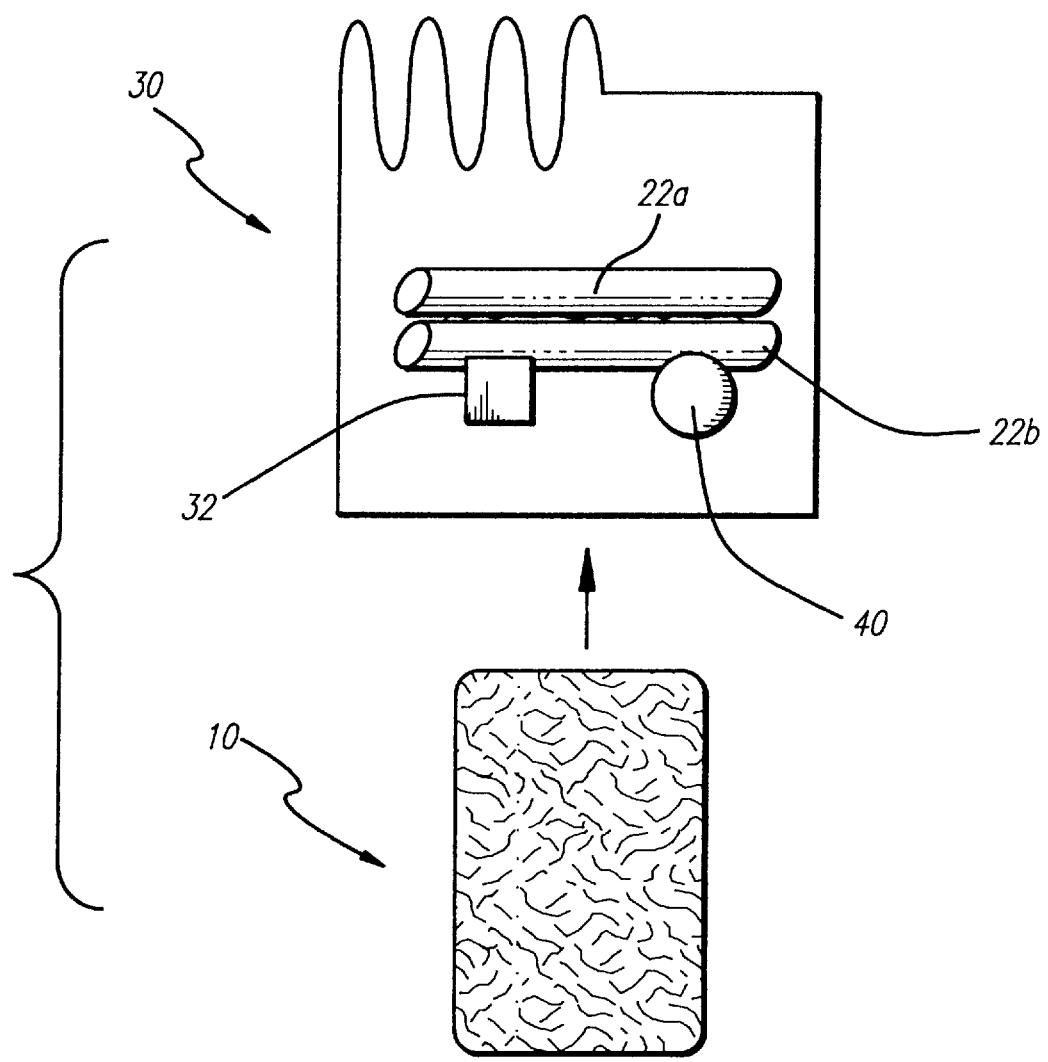
FIG. 7 is a top plan view of an exemplary currency reader illustrating the magnetic head, the optical reader and the feedpath pinch rollers with a cleaning card to be inserted into the currency reader.

Referring to the Figures, the encoded cleaning card of the present invention is generally referred to by the numeral 10. The cleaning card 10 may be made of a single layer of material that is non-laminated or may be a multi-layer, laminated card.

Referring to FIGS. 1–6 in the laminated embodiment of the present invention, the cleaning card 10 comprises, generally, a flat, semi-rigid and generally rectangular base 12 with a mildly or substantially abrasive first material 14 bonded to a first side surface 16, and a woven or nonwoven soft second material 18 bonded to a second side surface 20. The second material 18 functions to pick up contaminants as the cleaning card 10 passes through the equipment being cleaned and thus removing the contaminants from the equipment. The cleaning card 10 may be presaturated with a cleaning solvent, such as anhydrous alcohol (isopropanol) for example, or the solvent may be added just prior to using the cleaning card 10. It is appreciated that the cleaning card 10 may also be provided in a dry, a non-saturated state.

For use in a currency identification device, the cleaning card 10 has one or more magnetic codes 19, such as magnetic ink, placed in an appropriate area on the surface 16 near the leading edge 21 of the cleaning card 10, or in any other locations of the cleaning card 10, so as to indicate to a currency reader 30 that the cleaning card 10 of the present invention appears to be actual currency. The magnetic head 32 of the currency reader 30 reads the magnetic code 19 on the cleaning card 10 and identifies the cleaning card 10 as being compatible with the currency reader 30 such that the cleaning card 10 may proceed into the currency reader 30. Depending on the type of currency reader, the currency reader 30 may search the cleaning card 10 for the presence of the magnetic code 19 on the leading edge 21 of the cleaning card 10, in the middle of the cleaning card 10 and the trailing edge 23 of the cleaning card 10. As each of the magnetic codes 19 are detected by the currency reader 30, the cleaning card 10 travels further into the currency reader 30. In the event that all the magnetic areas normally present on currency are not detected on the cleaning card 10 by the currency reader 30, then the cleaning card 10 is ejected from the currency reader 30.

The ejection of the cleaning card 10 from the currency reader 30 may occur at different stages of the insertion of the cleaning card 10 into the currency reader 30. For example, if only the magnetic code 19 on the leading edge 21 of the cleaning card 10 is present, the cleaning card 10 will travel into the reader 30 until the next detection point, which may be the middle of the cleaning card 10, such that the cleaning card 10 is inserted approximately fifty percent of its length prior to being ejected. Similarly, if the cleaning card 10 has a magnetic code 19 on the leading edge 21 and in the middle of the cleaning card 10, but not on the trailing edge 23 of the cleaning card 10, the cleaning card 10 will travel into the currency reader 30 past the middle of the cleaning card 10 up to the trailing edge 23 of the cleaning card 10, before the cleaning card 10 is ejected from the currency reader 30. In this manner the length of the cleaning card 10 that is drawn into the currency reader 30 may be varied by varying the placement and number of the magnetic codes 19 on the cleaning card 10.

It is preferred that the cleaning card 10 is not validated by the currency reader 30, such that the cleaning card 10 is rejected from the currency reader 30 and not accepted as currency. In this manner, the cleaning card 10 achieves its purpose in cleaning the sensors and feed path of a currency reader 30, without being taken by the currency reader. Once the cleaning card 10 enters approximately 50–95% of its length into the currency reader 30, it is enough to perform the cleaning procedure, the cleaning card 10 is accepted, but not validated as legitimate currency and returned to the operator. The cleaning card 10 goes into the currency reader 10, cleans the magnetic head 32, the feed path, rollers 22a and 22b and guides. The cleaning card 10 allows for faster and more efficient cleaning of the equipment to remove stubborn contaminants and for daily cleaning of contaminants.

Alternatively, it is appreciated that the encoded portion 19 may comprise of other types of materials capable of activating sensors. Such materials may include, but are not limited to, prismatic inks which refract light in a pattern that is detectable by an optical sensor or fibre optics to direct the transmission of light in a desired direction for detection by an optical sensor.

Referring to FIG. 5A, in order to activate the optical sensors of a currency reader 30, the cleaning card 10 comprises at least a portion that is opaque, such that a light beam is broken when the cleaning card 10 is inserted between the light emitter 40 and a light receptor 42 of the currency reader 30. The breaking of the light beam causes the travel mechanism, such as the pinch rollers 22a and 22b, of the currency reader 30 to engage the cleaning card 10, thereby drawing the cleaning card 10 into the currency reader 30. If the light beam is not broken by the cleaning card 10 being inserted into the currency reader 30, then the currency reader 30 is not activated and the cleaning card 10 is not accepted by the currency reader 30.

The cleaning card 10 may comprise a combination of magnetic codes 19 and optical patterns to simulate the magnetic encoding and optical patterns being sought by a currency reader. The cleaning card 10 may have a magnetic code 19 on the leading edge 21 of the card, in the middle of the cleaning card 10 and at the trailing edge of the cleaning card 10 and may include optical patterns proximate and/or between the magnetic codes 19.

Figure 10:
FIG. 10 is a diagrammatic illustration of the front side of a dollar bill.
Figure 11:
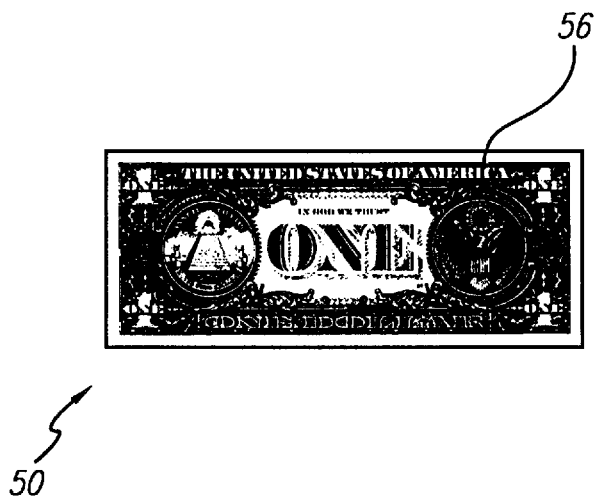
FIG. 11 is a diagrammatic illustration of the back side of a dollar bill.

Referring to FIGS. 10 and 11, in addition to the magnetic codes 19, the cleaning card 10 may have an optical pattern of currency, such as a dollar bill 50 having the light and dark patterns 52 formed by the presidential portrait 54 or other insignia 56 in contrast with the lighter background surrounding the portrait 54 of a dollar bill 50. The cleaning card 10 is then identified as currency and is drawn into the currency reader 30 in its entirety but is not validated because all of the magnetic and optical codes normally present on currency are not present on the cleaning card 10. It is appreciated that the optical patterns of the cleaning card 10 may include bar codes or any other symbol recognizable by a currency reader.

The cleaning card 10 may be colored to increase its opacity in order to trigger light sensors on some equipment. Neither a white laminated nor non-laminated cleaning card can work on such equipment. For example, without sufficient opacity, cleaning cards may not work at all in almost all gaming and wagering machines. Black is the preferred color used for sufficient opacity. However, the color of the card of the present invention is not limited to black.

The base 12 of the cleaning card 10 is preferably constructed of acrylic, PVC, PET, ABS plastic material or the like. It is generally rectangular, but can have any shape suitable for its intended purpose, and is sized in accordance with the card that carries the data. The thickness of the card may obviously vary depending on its use. It is preferred that the base 12 be approximately 0.006–0.024 mils thick depending on the equipment. The plastic base 12 may also include an anti-static compound to prevent the buildup of static inside the static sensitive processing equipment. Most currency readers and all dollar bill validators, for example, move the cleaning card back and forth several times to "validate" the card. This back and forth motion generates a potential static charge buildup. By adding a static inhibitor, there is little if any static buildup during this attempted "validation" process. One useful anti-static compound is available from Gen-Labs, Inc. (formerly General Chemicals) Chino, Calif., and is sold as "Anti-Static Glass Cleaner." Other anti-static compounds that may be used are well known in the art.

In the preferred embodiment of the cleaning card 10, the fibers of the first and second materials 14 and 18 are mechanically bonded to the first and second side surfaces 16 and 20 of the base 12 by a extrusion lamination process wherein the plastic base material is extruded into the shape of a sheet and the first and second materials 14 and 18 pressed upon the first and second surfaces 16 and 20 of the molten plastic until the fibers of the first and second materials 16 and 20 mechanically bond to the side surfaces 16 and 20 of the base 12. Calendaring rolls apply pressure to the base 12 and first and second material 16 and 20. The base plastic is then cooled which stiffens up the cleaning card 10. By using a mechanical bond, rather than a chemical bond, the need for adhesives and all their attendant problems are eliminated. For example, the structural integrity of the cleaning card 10 is not subjected to deterioration when a cleaning solvent is added to the cleaning card 10.

In the laminated embodiment of the cleaning card 10, the first material 14 is preferably a non-woven spunbonded polyester, with a higher friction coefficient than the second material 18. One example of such material includes Reemay 2000 or 2200 series. Reemay is available from Reemay, Inc., Old Hickory, Tenn. Reemay is an abrasive material with little absorptive capacity and is traditionally used for a wide variety of applications unrelated to cleaning cards. With a relatively thin cleaning card (e.g., 0.010 mils), the preferred style Reemay is 2006. For a thicker base (e.g., 0.024 mils) Reemay style 2024 is preferred. As shown in FIG. 3, the first material 14 has a larger surface area than the second material shown in FIG. 4.

The larger surface area of the first material 16 permits faster evaporation of any alcohol that is absorbed, yet it picks up more dirt than the second material 18. Furthermore, the first material 16 is more durable and rugged than the second material 18, thereby increasing the longevity of the cleaning card 10 over a conventional card.

The second material 18 is preferably a spunlaced fabric with excellent softness and draping qualities. It should be strong, and lightweight. One such fabric is sold under the brand name Sontara available from DuPont, Wilmington, Del. With a relatively thin base, the preferred style Sontara is 8001. With a thicker base, Sontara style 8801 is used. The softness of the fabric, its absorptive capacity, and because it does not shed, permits its use as a cleaning card used on a frequent and regular basis. Its absorptive capacity permits a cleaning fluid or solvent to be absorbed evenly and quickly.

Wicking action of the second material 18 draws the cleaning solvent up so that it is the side that contains most, of the cleaning solvent. This wicking action keeps the cleaning solvent where it is most desired.

The laminated embodiment of card can have: Reemay material on both sides; Reemay on one side and Sontara on the other side; Sontara on both sides; or any other materials suitable for its intended purpose.

In an alternative embodiment, as shown in FIG. 6, Imperial Lapping Film (ILF) 14a from 3M Corp., St. Paul, Minn. is used as the abrasive first material 14. The 3M Imperial Lapping Film is 3 mil made from Aluminum oxide, 9 microns, 1200 mesh size. This material is also substantially impenetrable to cleaning solvents.

It is appreciated that the cleaning card 10 may also comprise of a sponge-like, material that is compressible, such that when the cleaning card 10 is drawn into a card reader 30, the cleaning card 10 is compressed. As the cleaning card 10 travels through the currency reader 30 and encounters an opening or depression in the interior of the currency reader 30, the compressed material may return to its normal state in order to clean optical sensors which may be recessed from the feed path in the currency reader 30. Such compressible materials include but are not limited to sponges, cork, foams, styrofoams and resilient plastics.

In use of the invention, as shown in FIGS. 1 and 5, the cleaning card 10 is passed through the equipment (an exemplary currency reader 30 in FIGS. 5A and 5B) in the same manner as currency. The cleaning card 10 picks up contaminants as it passes between a pair of rollers 22*a* and 22*b* and against the head 32.

For preventive maintenance, the second side surface having the soft material and solvent thereon must be positioned to pass against the head 30 and the roller 22*a* on the same side as the head (See FIG. 5). The abrasive first side 16 of the cleaning card 10 passes against the other roller 22*b*. The rollers 22*a* and 22*b* are more resistant to abrasion and are less critical components than the head 32.

For corrective maintenance, the abrasive first side surface 16 is passed against the head 24 or rollers 22*a* and 22*b*, thereby removing stubborn contaminants that have become encrusted or fixed onto the head, rollers, etc. Since the abrasive first material 14 is resistant to absorption by the cleaning solvent, using the one card with a "wet" softer side first followed by the dry" abrasive side also permits a quicker cleanup which restores operations more quickly and reduces the equipment's exposure to the cleaning solvent. Use of the abrasive surface thus reduces equipment downtime and service calls. It eliminates the need for equipment disassembly.

The abrasive surface obviously cannot and should not be used on a frequent basis but can be used when corrective heavy duty cleaning is required and equipment disassembly is undesirable. Although this discussion has been limited to rollers, sensors and heads, it should be appreciated that the cleaning cards of the present invention can be used to clean other equipment such as strippers, guide rollers, paper pad and metal plate, smart card readers, contact points, contact chips.

Referring to FIGS. 8 and 9, the non-laminated embodiment of the cleaning card of the present invention is shown and generally referred to by the numeral 10'. The cleaning card 10' is made of a material that is sufficiently dense and opaque to prevent the passage of light through the cleaning card 10 in order to break a beam of light emitted from an optical sensor in a currency reader. If the non-laminated cleaning card 10' is not opaque enough, the surface of the cleaning card 10' can be printed on to make the cleaning card 10' sufficiently opaque to prevent the passage of light. The non-laminated embodiment of the cleaning card 10' may be made of Reemay or any other rigid or semi-rigid material suitable for its intended purpose including but not limited to the materials described above in reference to cleaning card 10.

It is appreciated that the non-laminated cleaning card 10' may include any of the above-described encoding means such as magnetic code 19, prismatic inks, light and dark patterns, bar codes, and the like capable of activating currency readers in order to impel the cleaning card 10' into the currency reader in order to perform the cleaning operations of the currency reader components.

Although a particular embodiments of the invention have been described in detail for purposes of illustration, various modifications may be made without departing from the spirit and scope of the invention.

What is claimed is:

1. A cleaning card for cleaning currency readers, the cleaning card comprising:

a material for cleaning currency readers into which said cleaning card is adapted to be inserted, said material having a first side surface and a second side surface, an insertion end and a trailing end; and means for activating a currency reader associated with said material, said activating means including identification characteristics used by a currency reader to identify currency.

2. The cleaning card of claim 1 in which said activating means comprises at least one magnetic portion.

3. The cleaning card of claim 2 in which said magnetic portion is located proximate the insertion end of said material.

4. The cleaning card of claim 3 including a second magnetic portion between said insertion and trailing ends.

5. The cleaning card of claim 4 including a third magnetic portion proximate said trailing end.

6. The cleaning card of claim 1 in which said activating means includes magnetic ink.

7. The cleaning card of claim 1 in which said activating means includes prismatic ink.

8. The cleaning card of claim 1 in which said activating means includes an optical pattern recognizable by the currency reader.

9. The cleaning card of claim 8 in which said optical pattern comprises light and dark patterns.

10. The cleaning card of claim 8 in which said optical pattern is a bar code.

11. The cleaning card of claim 1 in which said activating means includes at least one magnetic portion and at least one optical pattern recognizable by the currency reader.

12. The cleaning card of claim 1 in which said material is presaturated with a cleaning solvent.

13. The cleaning card of claim 1 in which at least a portion of said material is darkly colored to increase its opacity, whereby it is accepted into the currency reader.

14. The cleaning card of claim 1 in which at least a portion of said material is opaque whereby it is accepted into the currency reader.

15. The cleaning card of claim 1 in which at least a portion of said material includes a compressible material that is capable of expanding after insertion into the currency reader.

* * * * *